United States Patent [19]

Bernard

[11] 4,114,848
[45] Sep. 19, 1978

[54] MOUNTING PLATE

[75] Inventor: Pierre Jean Bernard, Versailles, France

[73] Assignee: La Telemecanique Electrique, France

[21] Appl. No.: 740,621

[22] Filed: Nov. 5, 1976

Related U.S. Application Data

[63] Continuation of Ser. No. 538,387, Jan. 3, 1975.

[51] Int. Cl.² .............................................. A47B 91/00
[52] U.S. Cl. ........................................ 248/346; 248/23
[58] Field of Search .................................. 248/23, 346

[56] References Cited

U.S. PATENT DOCUMENTS

| 3,823,904 | 7/1974 | Stenger | 248/23 |
| 3,908,941 | 9/1975 | Bromley et al. | 248/23 |
| 4,012,021 | 3/1977 | Duceppe | 248/23 |

FOREIGN PATENT DOCUMENTS 1,502,640  10/1967  France ...................................... 248/23

Primary Examiner—Robert A. Hafer
Attorney, Agent, or Firm—William Anthony Drucker

[57] ABSTRACT

Perforated mounting plate permitting the attachment of electrical equipment whose center-to-center distances and the diameter of the fixing members are in accordance with certain recommended dimensions.

5 Claims, 6 Drawing Figures

MOUNTING PLATE

This is a continuation of Ser. No. 538,387, filed Jan. 3, 1975.

The invention relates to a perforated plate for the mounting of devices fixed by means of screws. The invention more particularly relates to a mounting plate for the attachment of devices whose centre-to centre distances are whole multiples of a modulus with the aid of a screw with a predetermined diameter entering rectangular holes having the same dimensions and spaced from one another so as to leave cross-members between them.

Perforated mounting plates are already known wherein each opening of predetermined width is separated from the next opening by a cross-member also of predetermined width, whereby resilient clips each of which is associated with a nut of predetermined diameter make it possible to bring the latter in front of each of the openings permitting the fixing of devices whose centre-to-centre distances are variable. Such a mounting plate is, for example, known from French Pat. No. 1,502,640 issued to the assignee of the same inventor.

In these known mounting plates the dimensions of the holes have generally been selected in such a way that they are adapted to devices having particular centre-to-centre distances. However, the development of different devices and more particularly the tendency to reduce overall dimensions has led to production of devices having different centre-to-centre distances and it is difficult or impossible to mount such different devices due to the limitation of the centre-to-centre distances which could be produced.

If the diameter selected for the fastening screw is less than the centre-to-centre distance, it is known that the perforated plate can be produced by making holes whose diameter is compatible with that of the fastening screws with the same spacing as the centre-to-centre distances in the vertical and horizontal directions. Such mounting plates are also already known.

The invention more particularly proposes to provide a mounting plate with minimum sized holes making it possible to successively produce centre-to-centre distances which are multiples of a predetermined modulus when the diameter chosen for the fastening screws is at least equal to or greater than the modulus whilst providing the said plate with interesting criteria as regards stability and strength as well as rational utilisation of the metal, this applying to several pairs of modulus and diameter values.

The modern tendency is towards recommending centre-to-centre distances for the devices in the vertical direction as a function of a predetermined modulus whilst giving the designer a certain freedom as regards the selection of the horizontal centre-to-centre distance. The latter can therefore be chosen more easily taking account of other criteria directly connected with the types of devices used.

The invention also aims at retaining in the series of possible holes one whose dimensions are such that it can be used for fixing devices which are to be attached to standardised fixing rails such as defined in Standard DIN No. 46,277, page 3. Finally, the invention aims at providing perforated plates whereof at least one portion of the ends is shaped to permit the side-by-side mounting of plates without any gaps in the spacing of the holes.

According to the present invention there is provided a mounting place for use in conjunction with devices to be attached to the plate. The devices include openings to receive fastening screws. The centre-to-centre distances of these openings are whole multiples of a modulus $e$. The fastening screws have a diameter $\phi$. The mounting plate includes a plurality of rectangular holes each of the same dimensions, and cross-members are defined between neighbouring holes. The spacing of the neighbouring rectangular holes is the product of the modulus $e$ and an odd number not less than 3. The spacing is also greater than the sum of the modulus $e$ and one-and-a-half times the diameter $\phi$ of the screws. The width of each cross-member is not less than half the diamer $\phi$ of the screws.

Other advantageous features will be apparent from the following description with reference to the accompanying drawings, wherein FIG. 1 shows the base of a device to be fixed to a mounting plate;

Figure 1:
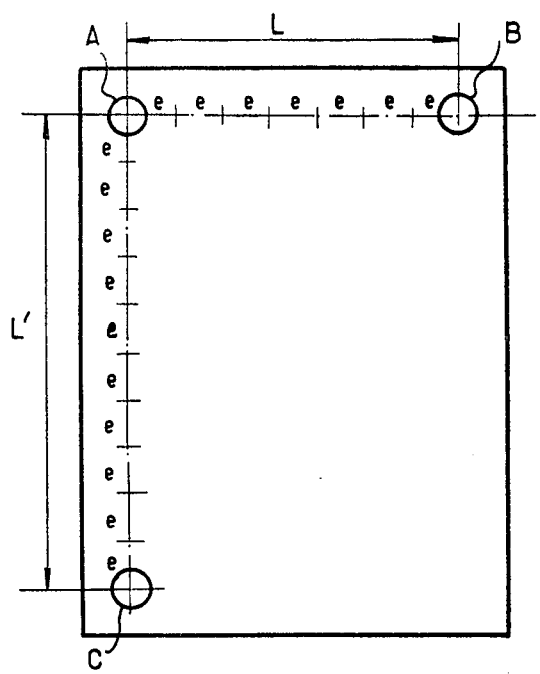

In FIG. 1, there is shown the base of a device to be fixed to a perforated mounting plate by means of screws or analogous means which pass through openings A, B and C. In FIG. 1 it is assumed that the angle BAC is a right angle.

The dimensions of the centre-to-centre distances AB and AC of the openings are generally defined by standards which stipulate that these dimensions must be whole multiples of a predetermined selected modulus $e$, for example, 1 or 5 mm.

In FIG. 1 the distance L separating A and B is therefore equal to $k'e$, whilst the distance L' separating A and C is equal to $ke$.

The diameter of the fixing members such as screws 5 passing through openings A, B and C has a value $\phi$ which must itself be chosen within limits laid down by standards.

Figure 2:
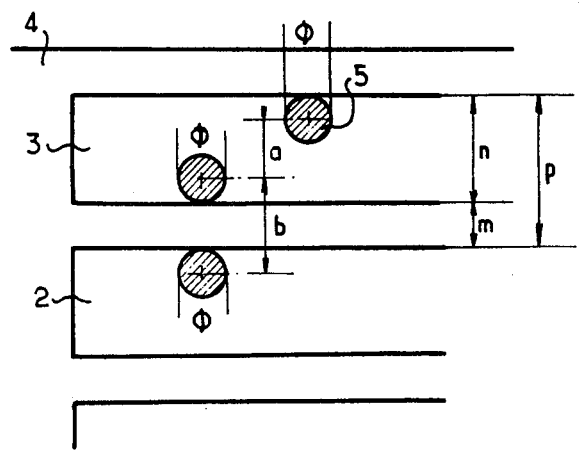
FIG. 2 shows dimensional relationships between the holes and the fixing screws.

FIG. 2 shows various positions which can be assumed by the fixing members such as screws 5 relative to a mounting plate 4 in which have been made parallel openings 3 of width $n$ separated from one another by cross-members 2 of width $m$. The spacing of the holes is designated by the reference letter $p$ so that $p = m + n$. These openings serve to permit the fixing of devices along the vertical centre-to-centre distances.

In the embodiment illustrated in FIG. 2 it is firstly proposed to make possible the attachment of devices whose centre-to-centre distances are multiples of a modulus $e$ using fastening screws whose diameter $\phi$ is equal to or greater than the selected modulus:

$$\text{thus } \phi \leqq e \tag{1}$$

The perforated plate will have maximum strength if the openings are small so that if the distance corresponding to a centre-to-centre distance where the screws are placed in the opening is called $a$, it is necessary to satisfy:

$$a = ke \tag{2}$$

$k$, being a positive integer of minimum value, it appears from FIG. 2 that $b = a + e$ and, therefore, $b = (k + 1) e$ As $p = a + b$, one has:
$p = (k + 1) e$ It it is provided that $m \geq 0.50$, in order that the crossbars are wide enough to be sufficiently stiff, it finally results that:

$$p \geq 1.5 \phi + e \atop p \geq 3e \quad \Big\} \quad (7)$$

Thus a perforated mounting plate according to the invention must simultaneously satisfy conditions (1), (2), (4) and must more particularly be suitable for the following examples of applications:
  (I) Fastening screws of diameter $\phi = 4$ mm with centre-to-centre distances which are multiples of the modulus $e = 1$ mm.
  (II) Fastening screws of diameter $\phi = 5$ mm with centre-to-centre distances which are multiples of the modulus $e = 5$ mm.
  (III) Fastening screws of diameter $\phi = 6$ mm with centre-to-centre distances which are multiples of the modulus $e = 5$ mm If the conditions (4) and I) are satisfied this leads to:

$$\Big\{ {p \geq 7 \atop p \geq 3} \quad (5)$$

thus $p \leq 7$
If conditions (3), (4) and III are satisfied this leads to:

$$\Big\{ {p \geq 12.5 \atop p \geq 15} \quad (6)$$

thus $p \leq 15$
If conditions (3), (4) and III are satisfied this leads to:

$$\begin{matrix} p & 14 \\ p & 15 \end{matrix} \quad (7)$$

thus $p \leq 15$
Therefore the common solution for conditions (5), (6) and (7) for a succession of holes with minimum spacing is:

$p = 15$ mm

From this the following values can be deduced:

| | Table of Relative Values | | |
|---|---|---|---|
| | I | II | III |
| | $k_1 = 7$ | $k_2 = 1$ | $k_3 = 1$ |
| | $a_1 = 7$ | $a_2 = 5$ | $a_3 = 5$ |
| | $b_1 = 8$ | $b_2 = 10$ | $b_3 = 10$ |
| $m = b - \phi$ | $m_1 = 7$ | $m_2 = 5$ | $m_3 = 4$ |
| $n = p - m$ | $n_1 = 8$ | $n_2 = 10$ | $n_3 = 11$ |

The hole satisfying the three applications is defined for a spacing $p = 15$ mm by the width of the opening $n = 11$ and by the width of the cross beam $m = 4$.

Examination of the above table shows that an opening of a width equal to 11 mm separated from the next opening by a 4 mm cross-member makes it possible to simultaneously obtain a series of centre-to-centre distances rising by increments of the modulus 1 mm with screws of diameter 4 mm and a minimum centre-to-centre distance of 4 mm, as well as a series of centre-to-centre distances rising by increments of the modulus 5 mm with a screw of diameter 6 mm and a minimum centre-to-centre distance of 10 mm.

Figure 4:
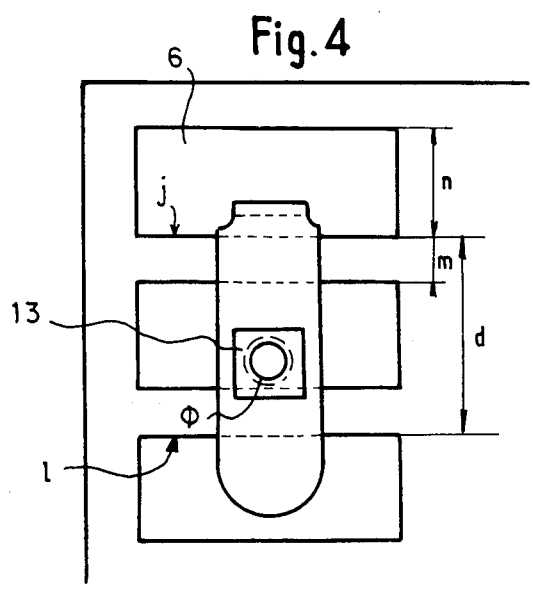
FIG. 4 shows a sliding nut located facing a hole on the mounting plate.

Moreover, the distance $d$ separating the most remote edges $j$ and $l$ of two adjacent cross-members is equal to 34 mm (cf. FIG. 4).

This value is interesting because it makes it possible to attach devices which are to be fixed to standardised rails according to DIN 46,277, page 3, provided that the mounting plate thickness is about 2 mm.

Figure 3:
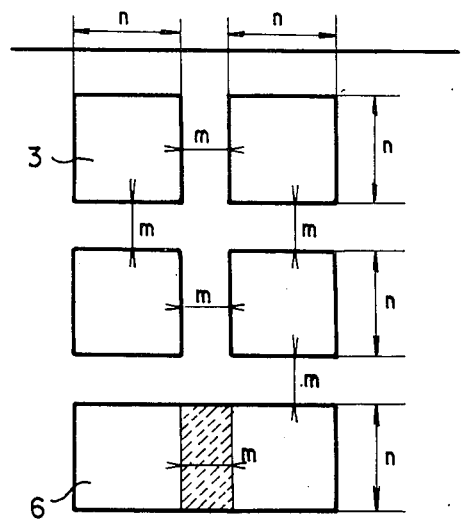
FIG. 3 shows the formation of a rectangular hole.

Instead of making square openings in order to facilitate attachment of these devices and obtain freedom in the choice of the horizontal centre-to-centre distances, the openings are preferably enlarged by removing every other crossmember which gives a mounting plate having rectangular openings 6 whose dimensions are 11 × 26 mm and which are spaced by 15 mm in the vertical direction and by 40 mm in the horizontal direction, cf. particularly FIG. 3.

When two plates have to be placed side-by-side, due to an increase in the number of devices required, it is desirable to ensure the continuity of the spacing of the holes so that certain members can possibly be placed astride them.

Figure 5:
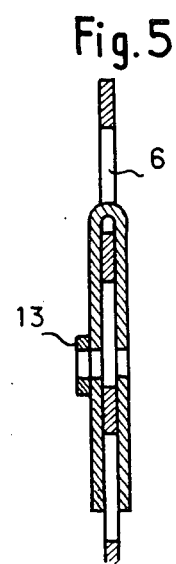
FIG. 5 shows a sectional view of the mounting plate.
Figure 6:
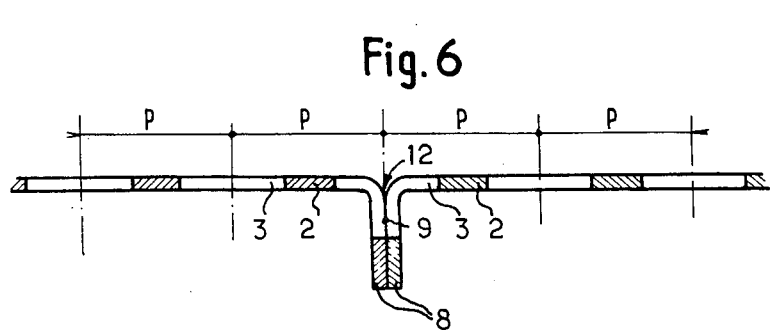
FIG. 6 shows the juxtapositioning of two adjacent mounting plates.

This problem has been solved by means of a 90° folding of the two horizontal edges 8 of each mounting plate, whereby the said fold 12 passes exactly through the horizontal axis of symmetry of adjacent openings of the edges, cf. FIGS. 5 and 6, where reference numeral 13 indicates a fixing member comprising a sliding nut.

Rigidity is also significantly increased because the thus folded edge behaves like a perforated support 9.

The two other vertical edges whose adjacent holes serve to fix the plate on vertical posts is also folded at 90° without it being necessary for the fold to pass via these holes.

According to an interesting variant oblong openings can be obtained by using two pairs of different dimensions ($m$ and $n$) and ($m'$ and $n'$), whereby each of the pairs of dimensions correspond to widths of the opening and the cross member according to one of the two rectangular directions.

I claim:
1. A mounting plate for use in conjunction with
  (a) devices to be attached to said mounting plate, said devices including openings to receive fastening screws, the centre-to-centre distances of said openings being whole multiples of a predetermined modulus $e$
  (b) fastening screws for attaching said devices to said mounting plate, said screws having a predetermined diameter $\phi$;
said mounting plate including a plurality of rectangular holes each of the same dimensions and defining cross-members between neighbouring holes, the spacing ($p$) of neighbouring rectangular holes being the smallest value which satisfies all of the conditions that:
  (i) ($p$) is the product of modulus $e$ and an odd number not less than 3;
  (ii) ($p$) is greater than the sum of modulus $e$ and one-and-a-half times the diameter $\phi$ of the screws; and

(iii) ($p$) is such that the width of each cross member is not less than half the diameter $\phi$ of the screws.

2. A mounting plate, as claimed in claim 1, wherein said spacing of neighbouring rectangular holes is selected to permit holes of the mounting plate to receive (i) screws having a first diameter $\phi$ in openings of a device in which the centre-to-centre distances of said openings are whole multiples of a first modulus $e$, and (ii) screws having a second diameter $\phi$ in openings of at least another device in which the centre-to-centre distances of said openings are whole multiples of a second modulus $e$.

3. A mounting plate, as claimed in claim 1, wherein said spacing of neighbouring rectangular holes is 15 mm., and wherein said width of said cross-members is 4 mm.

4. A mounting plate, as claimed in claim 3, wherein said rectangular holes are square, and modified in that each alternate cross-member is removed.

5. A mounting plate, as claimed in claim 1, having a portion bounded by an edge thereof bent, at 90° to the plane of the remainder of the plate, along a line coinciding with the median axis of symmetry of a series of said openings next adjacent to said edge.

* * * * *